(12) United States Patent
Henely

(10) Patent No.: US 6,169,770 B1
(45) Date of Patent: Jan. 2, 2001

(54) PREEMPTIVE PROCESSOR FOR MODE S SQUITTER MESSAGE RECEPTION

(75) Inventor: Steven J. Henely, Cedar Rapids, IA (US)

(73) Assignee: Rockwell Collins, Inc., Cedar Rapids, IA (US)

( * ) Notice: Under 35 U.S.C. 154(b), the term of this patent shall be extended for 0 days.

(21) Appl. No.: 09/004,372

(22) Filed: Jan. 8, 1998

(51) Int. Cl.⁷ .................................................. H04L 25/06
(52) U.S. Cl. ......................... 375/317; 375/287; 375/349; 342/13
(58) Field of Search ................................... 375/287, 317, 375/349; 342/29, 30, 91, 13, 45

(56) References Cited

U.S. PATENT DOCUMENTS

| | | | |
|---|---|---|---|
| 4,510,469 | 4/1985 | Bowman | 333/21 R |
| 4,831,629 | 5/1989 | Paoli et al. | 372/50 |
| 4,897,659 * | 1/1990 | Mellon | 342/45 |
| 4,910,521 * | 3/1990 | Mellon | 342/45 |
| 5,063,386 * | 11/1991 | Bourdeau et al. | 342/40 |
| 5,089,822 | 2/1992 | Abaunza et al. | 342/30 |
| 5,182,563 | 1/1993 | Blinchikoff et al. | 342/32 |
| 5,240,866 | 8/1993 | Freidman et al. | 437/8 |
| 5,272,725 | 12/1993 | Jones et al. | 375/76 |
| 5,406,288 * | 4/1995 | Billaud et al. | 342/37 |
| 5,539,654 | 7/1996 | Aberg | 364/494 |
| 5,550,546 * | 8/1996 | Noneman et al. | 342/13 |
| 5,572,214 | 11/1996 | Ringel | 342/169 |
| 5,587,971 | 12/1996 | Thinesen | 368/70 |
| 5,673,197 * | 9/1997 | Keba et al. | 364/487 |

OTHER PUBLICATIONS

Electronic mail forwarded to S. Henely, authored by J. Gertz, "An Improved Mode S Downlink Preamble Detection Algorithm" pp. 1–6.

* cited by examiner

Primary Examiner—Stephen Chin
Assistant Examiner—Shuwang Liu
(74) Attorney, Agent, or Firm—Nathan O. Jensen; Kyle Eppele; J. P. O'Shaughnessy

(57) ABSTRACT

A preemptive processor for a tactical collision avoidance system (TCAS) selects mode S squitter messages from closer airplanes on a priority basis. The receiver has a higher sensitivity level to receive squitter messages at greater ranges. The high-level squitter messages preempt the lower-level squitter messages. The preemptive processor can be implemented as part of a application-specific integrated circuit (ASIC).

16 Claims, 3 Drawing Sheets

PREEMPTIVE PROCESSOR FOR MODE S SQUITTER MESSAGE RECEPTION

FIELD OF THE INVENTION

The present invention relates generally to a tactical collision avoidance system (TCAS) or an air traffic control radar beacon system (ATCRBS). More particularly, the present invention relates to a mode select (mode S) squitter message receiver.

BACKGROUND OF THE INVENTION

Tactical collision avoidance systems (TCASs) are utilized to maintain separation between flying aircraft and, thereby, to prevent air traffic accidents. These systems allow an aircraft to calculate the distance between it and another aircraft within a predetermined range. According to TCAS protocol, a transceiver or transponder disposed in a first aircraft continuously emits a squitter message. A transmitter disposed in a second aircraft transmits an interrogate message in response to the squitter message. The transponder provides a reply message, which is received and utilized by the second aircraft to calculate distance between the first aircraft and the second aircraft.

The squitter message and the reply message are radio frequency (RF) signals that are generated by radio-based radar in the transponder. The interrogation message can be created by a transmitter associated with TCAS. The squitter message is broadcast in the 1090 megahertz (MHz) frequency range and includes an address of the aircraft which sent the squitter message. The squitter message typically includes a preamble followed by data. The preamble can be a pattern of four spaced-apart pulses at known widths and at known positions with respect to each other. After the preamble, the data is provided, which generally includes the address of the aircraft. The data can be a several microsecond message.

The interrogation message is sent in the 1030 MHz frequency range and includes the address of the aircraft which sent the squitter message. In this way, only the aircraft that is addressed by the interrogation message provides the reply message. The reply message is a time-synchronized RF signal that is transmitted in the 1090 MHz frequency range. The distance between the first aircraft and the second aircraft can be calculated by determining the amount of time between sending the interrogation message and receiving the time-synchronized reply message.

Conventional squitter messages are transmitted by an aircraft to inform other aircraft of its presence. Typically, squitter messages have been broadcast (e.g. have been receivable) over a relatively short range, thereby limiting the number of aircrafts which receive the squitter message to only those which are in relatively close proximity. The short range is also implemented by limiting the sensitivity of the receiver. However, future systems may extend the range for squitter messages by increasing the sensitivity of the squitter message receiver.

It may be desirous to have squitter messages include position information derived from global navigational satellite systems (GNSS). The position information can be provided in the data associated with the squitter message. When flying routes, an aircraft can maintain separation when it is aware of the position of another aircraft in the vicinity. Maintaining separation advantageously reduces fuel consumption costs and air traffic delays. Receiving squitter messages and position information from an aircraft at greater distances even further augments the efficiency advantages.

As the transmission or reception range of squitter messages is increased, the receiving aircraft must be able to distinguish between squitter messages from an aircraft which is either relatively far away or relatively close. Squitter messages from a relatively close aircraft should be processed (e.g., at a higher priority) first to appropriately effect collision avoidance operations. For example, if a squitter message from a far away aircraft is being processed, instead of a squitter message from a close aircraft, the purpose of the collision avoidance system may not be achieved.

Thus, there is a need for a transponder which can differentiate from squitter messages transmitted by aircraft which are relatively close and by aircraft which are relatively far away. Further, there is a need for a squitter message receiver system which receives squitter messages from a close aircraft instead of squitter messages from a far away aircraft. Further still, there is a need for a mode S squitter message system which can differentiate from squitter messages transmitted by aircraft that are relatively close and relatively far away.

SUMMARY OF THE INVENTION

The present invention relates to a preemptive processor for use in a mode-S receiver system including a message processing circuit. The preemptive processor includes a signal input, a high-level threshold circuit coupled to the signal input, a low-level threshold circuit coupled to the signal input, a first preamble circuit, a second preamble circuit and a signal path control circuit. The high-level threshold circuit provides a high threshold signal at a high output, and the low-level threshold circuit provides a low threshold signal at a low output. The first preamble circuit is coupled to the high output and provides a first control signal in response to the high threshold signal including a message preamble at the high output. The second preamble circuit is coupled to the low output and provides a second control signal in response to the low threshold signal including the message preamble at the low output. The signal path control circuit has a message initialization output coupled to the message processing circuit and an end of message input coupled to the message processing circuit. The signal path control circuit provides a message initialization signal in response to the first control signal, and the switch path control circuit provides the message initialization signal in response to the second control signal if an end of message signal has been received after a previous message initialization signal.

The present invention further relates to a squitter message receiver system which includes a preemptive processing means for generating a high threshold signal and a low threshold signal and a message processing means for receiving a message signal. The preemptive processing means allows the message signal to be processed in response to the high threshold signal including a message preamble or in response to the low threshold signal including the message preamble. The message receiver system preempts the processing of the message signal associated with low threshold signal including the message preamble in favor the message signal associated with the high threshold signal including the message preamble.

The present invention still further relates to a method of processing data in a mode-S signal. The method includes steps of receiving an RF signal, low-level threshold processing the RF signal to generate a low threshold signal, high-level threshold processing the RF signal to generate a high threshold signal, and providing a message initialization signal if the high threshold signal includes a preamble or providing the message initialization signal if the low threshold signal includes the preamble.

The present invention even further relates to a squitter message receiver system including a signal input, a preemptive processor coupled to the signal input, and a message processor. The preemptive processor generates a high threshold signal and a low threshold signal. The preemptive processor provides a message initialization signal on a preemption basis in response to the high threshold signal including a message preamble or in response to the low threshold signal including the message preamble. The message processor is coupled to the input and the preemptive processor and processes a signal received at the input in response to the message of initialization signal.

According to one exemplary aspect of the present invention, a preemptive processor for a squitter message receiver includes a high threshold path and a low threshold path. If a signal including a preamble is present on the high threshold path, the high threshold path is chosen, otherwise, the low threshold path is chosen. The high threshold path preferably preempts any signals provided on the low threshold path.

According to another exemplary aspect of the present invention, a preemptive processor for a squitter message receiver provides a message initialization signal to a message processor circuit. The message processing circuit begins processing a message received at a signal input in response to the message initialization signal. The preemptive processor generates the message initialization signal in response to a high level threshold signal or a low level threshold signal. The message initialization signal is generated on a preemption basis wherein preambles detected on the high level threshold signal preempt preambles detected on the low level threshold signal.

BRIEF DESCRIPTION OF THE DRAWINGS

The invention will hereafter be described with reference to the accompanying drawings, wherein like numerals denote like elements and.

DETAILED DESCRIPTION OF PREFERRED EXEMPLARY EMBODIMENTS

Figure 1:
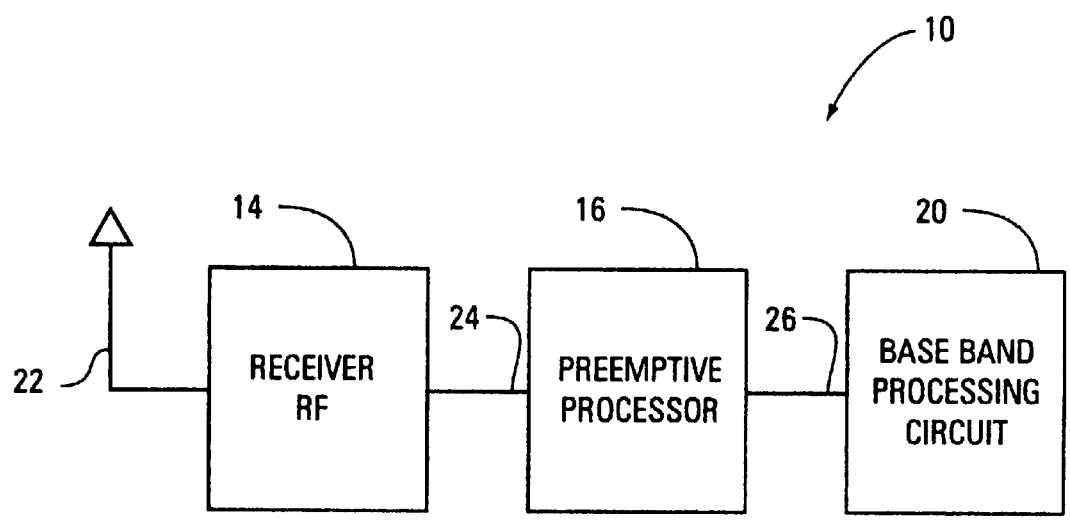
FIG. 1 is a general block diagram of a squitter message receiver, including a preemptive processor in accordance with an exemplary embodiment of the present invention.

In FIG. 1, a mode-S squitter message receiver system 10 includes an antenna 12, a radio frequency (RF) receiver circuit 14, a preemptive processor 16, and a message processing on base band processing circuit 20. Antenna 12 is coupled to RF receiver circuit 14. Circuit 14 is coupled to preemptive processor 16 by an RF input or a log video input line 24. Preemptive processor 16 is coupled to base band processing circuit 20 by path output line 26.

When in a listen mode, receiver system 10 has improved sensitivity to receive squitter messages from an aircraft at greater ranges. Listen mode refers to a mode in which system 10 is listening for squitter messages as opposed to an interrogation mode. Accordingly, the number of aircraft that can effectively transmit a squitter message to system 10 is increased. In a high air-traffic situation, system 10 advantageously selects squitter messages from an aircraft which is at a close distance over squitter messages from an aircraft which is at a greater distance.

Preemptive processor 16 operates to effectively select the squitter message from the closer aircraft. Processor 16 selects the squitter message with the highest signal strength while receiving a squitter message from another aircraft, whereby processor 16 operates under the assumption that the squitter message from the closest aircraft has the highest signal strength. Preemptive processor 16 provides a single squitter message at path output line 26 to base band processing circuit 20. Base band processing circuit 20 processes the squitter message for tactical collision avoidance system (TCAS) operations. Preferably, preemptive processor 16 determines if the squitter message has a preamble and selectively provides the data portion of the squitter message to circuit 20. The base band processing operations associated with circuit 20 are beyond the scope of the present application, which is related to the general operation of preemptive processor 16.

Alternatively, system 10 can be a receiver system for a railroad application which includes transmitters and receivers disposed on railroad cars. Processor 16 can be utilized to give priority to railroad cars attached to a particular train as opposed to cars attached to a different train. In this way, signals received from cars on one particular train preempt signals received from different trains because signals received from cars on the same train are typically stronger than signals from cars on a different train (e.g., farther away cars). Additionally, processor 16 can be utilized to select message from closer cars on the same train. Thus, system 10 can be employed in a variety of communications applications where priority should be given to closer signals.

Figure 2:
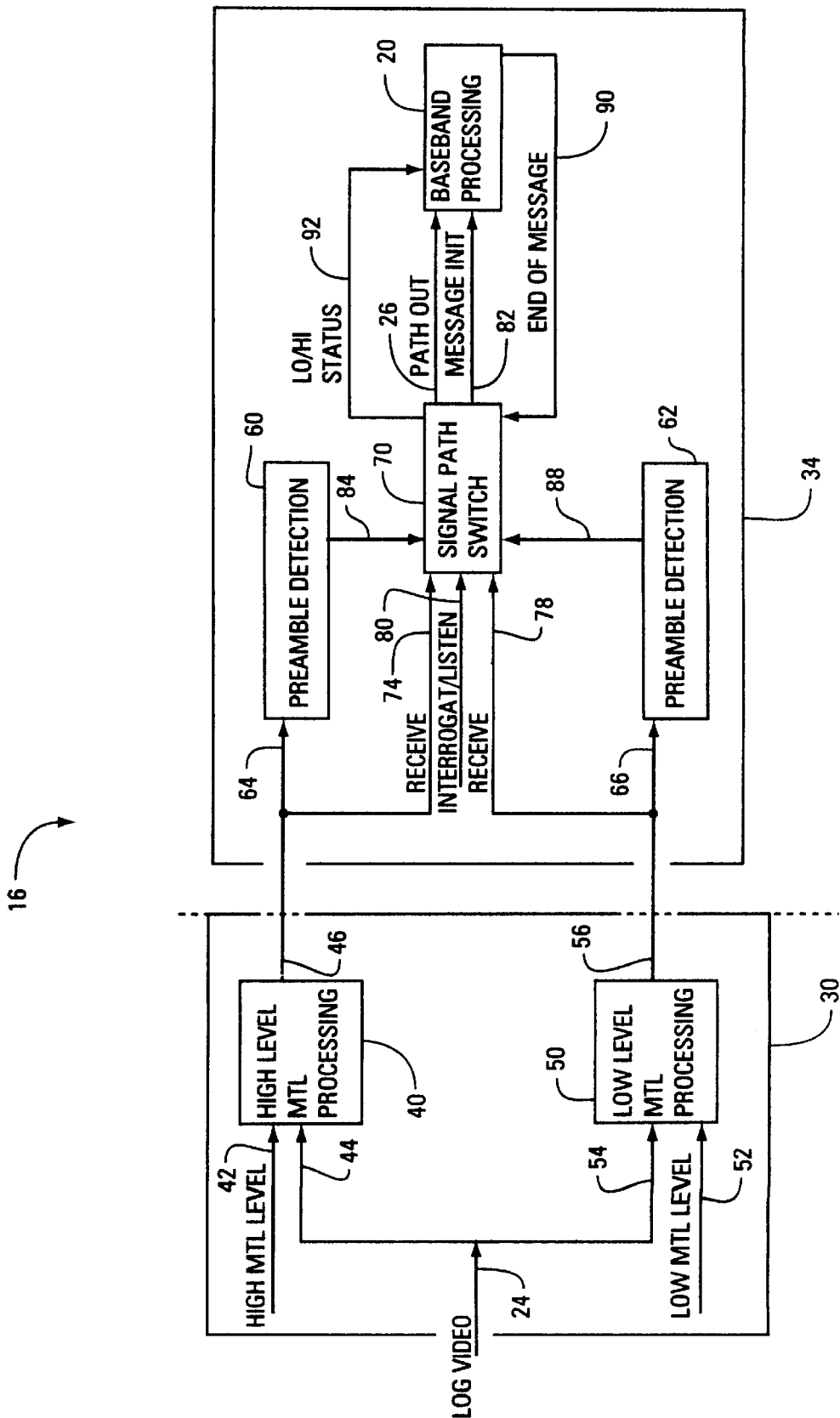
FIG. 2 is a more detailed block diagram of the preemptive processor illustrated in FIG. 1 in accordance with another exemplary embodiment of the present invention.

With reference to FIG. 2, preemptive processor 16 can be implemented by a video digitizer 30 and an application-specific integrated circuit (ASIC) 34. Digitizer 30 can also be implemented as part of ASIC 34. ASIC 34 preferably includes components associated with base band processing circuit 20 as well as processor 16. Processor 16 includes a high threshold or high level minimum trigger level (MTL) processing circuit 40, a low threshold or low level minimum trigger level (MTL) processing circuit 50, a preamble detection circuit 60, a preamble detection circuit 62, and a signal path switch circuit 70. Log video line 24 is coupled to an input 44 of circuit 40 and an input 54 of circuit 50.

Circuit 40 includes a high minimum trigger level input 42, and circuit 50 includes a low minimum trigger level input 52. Circuit 40 has an output 46 coupled to a receive input 74 of signal path switch circuit 70 and to an input 64 of preamble detection circuit 60. Similarly, circuit 50 has an output 56 coupled to a receive input 78 of signal path switch circuit 70 and to an input 66 of preamble detection circuit 62.

Preamble detection circuit 60 has a control signal output 84 coupled to signal path switch circuit 70, and preamble detection circuit 62 has a control signal output 88 coupled to signal path switch circuit 70. Path output line 26 is coupled between signal path switch circuit 70 and base band processing circuit 20. Additionally, signal path switch circuit 70 includes an interrogate listen mode control input 80, an end-of-message input 90, a low/high status output 92 coupled to base band processing circuit 20, and a message initiation output 82 coupled to base band processing circuit 20. The operation of preemptive processor 16 is discussed below, as follows, with reference to FIGS. 1 and 2.

Threshold circuits 40 and 50 of preemptive processor 16 receive signals provided by RF receiver circuit 14 on log video line 24. Circuit 40 compares the signal on line 24 to a high threshold or high trigger level provided at input 42. Preferably, the signal at input 42 specifies a level of −74 dBm, +/−2 dBm. When a signal is above the high threshold level, circuit 40 provides a logic high level at output 46. If the signal is below the high level threshold, circuit 40 provides a logic low level at output 46. The high minimum trigger level provided at input 42 is preferably determined by TCAS minimum operational performance requirements, such as, the D0185 standard.

Circuit 50 operates similarly to circuit 40. However, circuit 50 compares the signal at input 54 to a low threshold or low trigger level provided at input 52. The low minimum threshold level is preferably approximately −85 dBm. The thresholds provided at inputs 42 and 52 can be based upon a percentage of a high level RF signal, a fixed offset, or a variable based upon the history of the receiving signals. The exact thresholds are not given in a limiting fashion.

The signal provided at output 46 is provided to receive input 74 of circuit 70 and input 64 of circuit 60. Preamble detection circuit 60 analyzes the signal at input 64 (e.g., the high threshold signal) to determine if a preamble has been detected. Generally, the preamble is a sequence of four spaced pulses at known widths and known positions with respect to each other. If preamble detection circuit 60 detects the preamble, preamble detection circuit 60 provides a control signal at output 84 to signal path switch circuit 70. Signal path switch circuit 70 connects receive input 74 to path output 26 in response to receiving the control signal from output 84. Thus, processor 16 provides the data in the squitter message at output line 26 when the preamble is detected at input 64.

Additionally, signal path switch circuit 70 provides a message initialization signal at output 82 to provide an indication to base band processing circuit 20 that a new squitter message has been received. Signal path switch circuit 70 also provides an indication to base band processing circuit 20 that the squitter message was received from the high signal path at output 92. After the entire squitter message has been received, base band processing circuit 20 provides an end-of-message signal at output 90 to signal path switch circuit 70. Circuit 70 is generally in a listen mode by providing a listen control signal at input 80.

Preamble detection circuit 62 determines if a preamble has been received at input 66 from output 56 of circuit 50. If a preamble has been received from the signal at output 56 (e.g., the low threshold signal), circuit 62 provides a control signal at output 88 for circuit 70. Circuit 70 connects receive input 78 to path output 26 in response to control signal at output 88 if a high threshold signal is not being received at input 74. Therefore, circuit 70 maintains a connection between input 74 and path output 26 until an end-of-message signal is received at output 90. If a preamble is not detected from circuit 40 and input 74 is not connected to line 26, path circuit 70 connects input 78 to path output 26 in response to the control signal at output 88. Additionally, circuit 70 provides both an indication on output 92 that the signal being received is from circuit 50 and a message initialization signal at output 82.

Circuit 70 preempts a signal received at input 78 with a signal received at input 74 in response to the control signal at output 84, even though an end-of-message signal at output 90 has not yet been received from circuit 20. In this way, the squitter messages from a closer aircraft are received on a priority basis or preempt over squitter messages received from a distant aircraft.

In another representation of the control scheme associated with processor 16, signal path switch circuit 70 continuously couples input 78 to line 26, unless circuit 60 receives the preamble. When circuit 60 receives the preamble, input 74 is coupled to path output 26, and the appropriate signals are provided at outputs 26 and 92 until the end-of-message signal is received at input 90. Once the end-of-message signal is received, circuit 70 recouples input 78 to output 26. Circuit 20 ignores signals on path output 26 unless the message initialization signal is provided at output 82.

Although circuits 40, 50, 60 and 62 are shown as separate and distinct circuits in FIG. 2, circuits 40, 50, 60 and 62 can be combined as one or two circuits to reduce components associated with processor 16. The circuit can utilize multiplexing techniques to reduce the number of circuits 40, 50, 60 and 62. For example, a single circuit 40 could be utilized to produce the high and low threshold signals where two thresholds where provided by a multiplexer. Nonetheless, even though fewer components are utilized, such a scheme is well within the scope of the present invention as defined in the claims.

Figure 3:
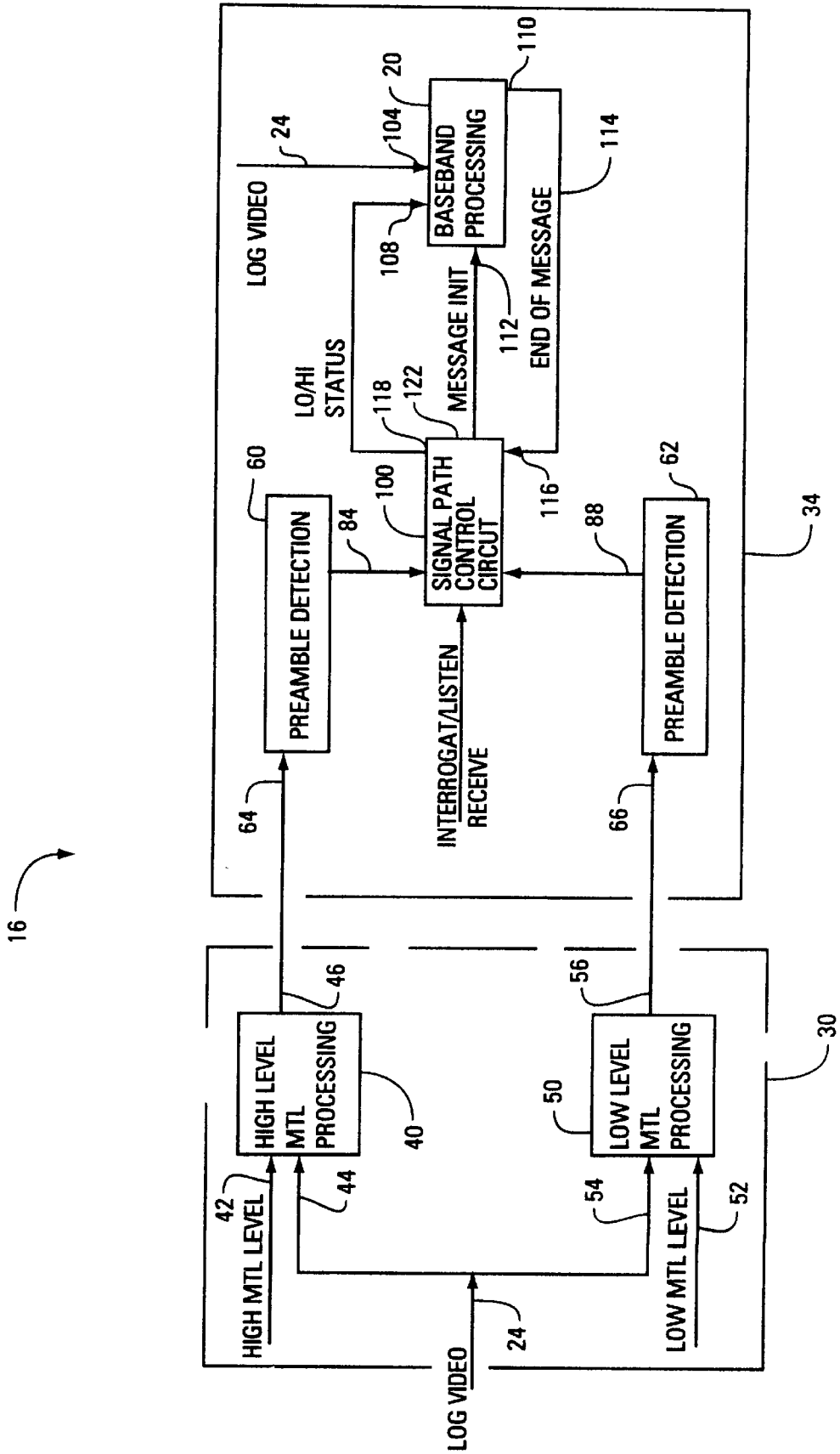
FIG. 3 is a more detailed block diagram of the preemptive processor illustrated in FIG. 1, in accordance with yet another exemplary embodiment of the present invention.

With reference to FIG. 3, another exemplary embodiment of a preemptive processor 16 similar to preemptive processor 16 discussed with reference to FIG. 2 is described below. Preemptive processor 16 includes a signal path control circuit 100 coupled to a message processing circuit 102. Message processing circuit 102 includes a log video input 104 coupled to log video input line 24.

Circuit 102 also includes a message initialization signal input 112, an end-of-message output 110, and a low/high status input 108. Signal path control circuit 100 includes a low/high status output 118, a message initialization output 122, and an end-of-message input 116. Input 116 is coupled to output 110 via a line 114. Output 122 is coupled to input 112, and output 118 is coupled to input 108.

Signal path control circuit 100 provides the message initialization signal at message initialization output 122 on a preemption basis. The preemption basis ensures that messages from closer aircraft are immediately processed by circuit 102 before messages from far away aircraft. Signal path control circuit 100 selectively provides the message initialization signal at output 122 to input 112 of circuit 102 to effect the advantageous priority processing of messages.

Message processing circuit 102 processes messages at log video input line 24 in response to the message initialization signal received at input 112. Once the message is completely processed or an amount of time expires in which the message should have been processed, circuit 102 provides an end-of-message signal at output 110 via line 114 to input 116 of signal path control circuit 100. Alternatively, circuit 100 can assume the end-of-message signal is received after a predetermined amount of time.

Signal path control circuit 100 provides a message initialization signal at output 122 in response to a control signal from circuit 60 or from circuit 62 if circuit 102 is not processing a message (e.g., after an end-of-message signal is received at input 116). However, if a message initialization signal is provided in response to control signal from circuit 60, signal path control circuit 100 does not provide another message initialization signal in response to a control signal from circuit 62 unless the end-of-message signal has been received at input 116. In this way, higher level signals at log video input line 24 are given priority over lower level signals (e.g., signals detected by circuit 60 preempt signals detected by circuit 62). If message processing circuit 102 is not processing any messages, signal path control circuit provides the message initialization signal at output 122 in response to the control signal from circuit 62.

Circuit 100 can preempt signals detected by circuit 60 if circuit 62 detects another signal by providing a message initialization signal even though the end-of-message signal has not been received. This operation is desirous because if a new preamble is detected by circuit 60, the signal being processed is probably contaminated by noise from the new signal. In contrast, if circuit 100 receives the control signal from circuit 62 when circuit 102 is processing a message detected by circuit 60, circuit 100 does not provide the message initialization signal. Thus, processor 16 can rely on the selective provision of the message initialization signal to implement the advantageous control scheme of the present invention.

Circuit 100 also provides a low/high status signal at output 118 which is indicative if the signal on line 24 is a low threshold signal or high threshold signal (e.g. was detected by circuit 62 or 60, respectively). Circuit 102 utilizes the status signal to appropriately process the message on line 24.

It is understood that, while the detailed drawings, specific examples, and particular component values given describe a preferred exemplary embodiment of the present invention, they are for the purpose of illustration only. The apparatus and method of the invention is not limited to the precise details and conditions disclosed. For example, although particular threshold values are discussed, any threshold value can be utilized. Further, single lines in the drawings may represent multiple conductors. Various changes may be made to the details disclosed without departing from the spirit of the invention, which is defined by the following claims.

What is claimed is:

1. A preemptive processor for use in a mode-S receiver system including a message processing circuit, comprising:
   a signal input;
   a high-level threshold circuit coupled to the signal input, the high-level threshold circuit providing a high threshold signal at a high output;
   a low-level threshold circuit coupled to the signal input, the low-level threshold circuit providing a low threshold signal at a low output;
   a first preamble circuit coupled to the high output, the first preamble circuit providing a first control signal in response to the high threshold signal and including a message preamble at the high output;
   a second preamble circuit coupled to the low output, the second preamble circuit providing a second control signal in response to the low threshold signal and including the message preamble at the low output; and
   a signal path control circuit having a message initialization output coupled to the message processing circuit and an end-of-message input coupled to the message processing circuit, the signal path control circuit providing a message initialization signal at the message initialization output in response to the first control signal, and the signal path control circuit providing the message initialization signal at the message initialization output in response to the second control signal if an end-of-message signal has been received at the end-of-message input after a previous message initialization signal.

2. The preemptive processor of claim 1, wherein the high threshold signal represents signals received at the signal input compared to a high threshold.

3. The preemptive processor of claim 2, wherein the low threshold signal represents signals received at the signal input compared to a low threshold.

4. The preemptive processor of claim 3, wherein the high threshold is −74 dBm, and the low threshold is −85 dBm.

5. The preemptive processor of claim 1, wherein the signal path control circuit includes a status output, and the signal path control circuit provides a low/high status signal in response to the first control signal or to the second control signal.

6. The preemptive processor of claim 1, wherein the signal path control circuit provides the message initialization signal immediately when the first control signal is provided.

7. The preemptive processor of claim 5, wherein the signal path control circuit does not provide the message initialization signal in response to the second control signal if the end-of-message signal has not been received at the end-of-message output.

8. The preemptive processor of claim 7, wherein the signal path control circuit immediately provides the message initialization signal in response to the first control signal, whereby the first control signal supersedes the second control signal.

9. The preemptive processor of claim 7, wherein the signal path control circuit includes a first control input coupled to the high threshold circuit and a second control input coupled to the low threshold circuit.

10. A method of processing data in a mode S signal, comprising:
    receiving an RF signal;
    low-level threshold processing of the RF signal to generate a low threshold signal;
    high-level threshold Processing of the RF signal to generate a high threshold signal;
    providing a message initialization signal if the high threshold signal includes a preamble;
    providing message initialization signal in the low threshold signal if the low threshold signal includes the preamble; and
    wherein the message initialization signal is only provided in response to the low threshold signal if the high threshold does not include the preamble.

11. The method of claim 10, wherein the RF signal is a squitter message.

12. The method of claim 11, wherein the squitter message includes position information.

13. The method of claim 11, wherein the squitter message is provided on a 1090 MHz carrier wave.

14. The method of claim 10, further comprising:
    providing a message complete signal after the data in the low threshold signal or in the high threshold signal is received.

15. A message receiver system, comprising:
    a signal input;
    a preemptive processor coupled to the signal input, the preemptive processor generating a high threshold signal and a low threshold signal. the preemptive processor z providing a message initialization signal on a preemption basis in response to the high threshold signal including a message preamble or in response to the low threshold signal including the message preamble;
    a message processor coupled to the input and the preemptive processor, the message processor processing a signal received at the input in response to the message initialization signal;

wherein the preemption basis includes immediately providing the message initialization signal in response to the high threshold signal including the message preamble; and wherein the preemption basis includes providing the message initialization signal in response to the low threshold signal including the message preamble only if the message processor is not processing the signal at the signal input.

16. The message receiver system of claim 15, wherein the preemption basis includes providing the message initialization signal in response to the low threshold signal including the message preamble only if the message processor is not processing the signal at the signal input in response to the message initialization signal generated due to the high threshold signal including the message preamble.

* * * * *